US007213606B2

(12) United States Patent
Nanni

(10) Patent No.: US 7,213,606 B2
(45) Date of Patent: May 8, 2007

(54) VALVE DEVICE, A UNIT FOR UNLOADING LOOSE MATERIALS FROM A DISPENSER DEVICE TO A USER UNIT COMPRISING THE VALVE DEVICE AND A METHOD FOR UNLOADING LOOSE MATERIAL FROM A DISPENSER DEVICE TO A USER UNIT

(75) Inventor: Patrizia Nanni, Capannori (IT)

(73) Assignee: Vima Impianti S.R.L., Porcari (Lucca) (IT)

( * ) Notice: Subject to any disclaimer, the term of this patent is extended or adjusted under 35 U.S.C. 154(b) by 0 days.

(21) Appl. No.: 11/061,823

(22) Filed: Feb. 22, 2005

(65) Prior Publication Data

US 2005/0189198 A1 Sep. 1, 2005

(30) Foreign Application Priority Data

Mar. 1, 2004 (IT) .......................... BO2004A0124

(51) Int. Cl.
*B08B 3/02* (2006.01)
*B08B 9/02* (2006.01)
*F16K 1/22* (2006.01)

(52) U.S. Cl. .............................. 137/15.04; 137/15.05; 137/240; 137/553

(58) Field of Classification Search ................ 137/613, 137/240, 554, 553, 15.04, 15.05
See application file for complete search history.

(56) References Cited

U.S. PATENT DOCUMENTS

| | | | | |
|---|---|---|---|---|
| 4,020,869 A * | 5/1977 | Davis et al. | ................ | 137/613 |
| 4,458,706 A * | 7/1984 | Scholes | ...................... | 137/240 |
| 4,846,212 A * | 7/1989 | Scobie et al. | .............. | 137/240 |
| 4,846,225 A | 7/1989 | Scobie et al. | | |
| 5,609,183 A * | 3/1997 | Parker | ........................ | 137/554 |
| 2005/0268951 A1* | 12/2005 | Pieri | .......................... | 134/172 |

FOREIGN PATENT DOCUMENTS

| | | |
|---|---|---|
| DE | 196 17 857 C1 | 7/1997 |
| DE | 100 24 950 C1 | 7/2001 |
| GB | 2 064 730 A | 6/1981 |

* cited by examiner

*Primary Examiner*—Kevin Lee
(74) *Attorney, Agent, or Firm*—Arent Fox PLLC

(57) ABSTRACT

A valve device comprises a pipe, a first closing element, mobile between a first position in which it leaves the pipe open and a second position in which it seals the pipe closed, a second closing element, mobile between a first position in which it leaves the pipe open and a second position in which it seals the pipe closed; the first and the second closing elements, in their respective second closed positions, form a chamber and the valve device also comprises an orbital head for supporting at least one nozzle which dispenses a washing fluid, for cleaning the chamber.

33 Claims, 6 Drawing Sheets

VALVE DEVICE, A UNIT FOR UNLOADING LOOSE MATERIALS FROM A DISPENSER DEVICE TO A USER UNIT COMPRISING THE VALVE DEVICE AND A METHOD FOR UNLOADING LOOSE MATERIAL FROM A DISPENSER DEVICE TO A USER UNIT

BACKGROUND OF THE INVENTION

The present invention relates to a valve device, in particular a valve device which can be used in a unit for unloading loose material from a dispenser device to a user unit.

The device disclosed can be used in particular in the chemical and/or pharmaceutical industry and in all cases for unloading containers of loose material consisting of powders, granulated material, pellets, tablets, capsules or similar products.

Such containers are normally emptied at an unloading station and the material they contain is transferred to a collection tank connected, for example, to a user unit or machine which uses the loose material for subsequent processing.

In the above-mentioned unloading station, a supporting structure holds the collection tank at a level lower than that of the container, to allow container emptying by gravity.

Connecting means are used to transfer the material from the container to the tank, said connecting means consisting, for example, of a rigid cylindrical tube with a vertical axis, supporting an interchangeable tubular bag in which the loose material being processed flows.

Such connections must be substantially airtight, so that, as the powdered material passes through the tubular bag, the diffusion of powders in the surrounding environment is kept within extremely narrow limits.

The importance of the problem mentioned above increases when the substances handled are chemical substances or compounds that are not easily degradable in the environment and in some cases potentially toxic or harmful.

Moreover, obviously when switching from processing one material to processing another, the tubular bag must be substituted and the connection thoroughly cleaned.

At its upper end, the cylindrical tube normally has a ring-shaped body, or spacer, designed for connection to the container and airtight fixing of the upper end of the tubular bag. The lower outfeed end of the container is also fitted with a valve element designed to open or close the lower end.

Said valve element normally consists of a butterfly valve with a flat disk-shaped shutter element that rotates in both directions about a horizontal axis between a position in which the lower end of the container is closed, with the shutter lying in a substantially horizontal plane, and a position in which the lower end of the container is open, with the shutter lying in a substantially vertical plane, allowing the material to be unloaded from the container to the cylindrical tube.

Conventional unloading units, of the type described, are not fully satisfactory as regards the problems relative to pollution. They have the disadvantage that, during container emptying, the face of the disk-shaped element which faces the outside environment when the valve element is closed makes contact with the powdered material during unloading, when the disk-shaped element is in the vertical position.

Secondly, during removal of the container from the cylindrical tube, the upper end of the spacer, having also been in contact with the powdered material, is exposed to the surrounding environment.

Attempts were made to overcome the above-mentioned disadvantages with a solution that involved inserting a hopper of a substantially known type between the valve element of the container and the above-mentioned spacer connected to the tubular pipe, equipping the spacer with a butterfly valve so as to form a washing chamber between the inner surface of the hopper, the lower surface of the container outfeed valve and the upper surface of the valve located substantially at the spacer infeed. Moreover, in said case, the hopper must be suitably modified and equipped with internal washing nozzles.

When the loose material has been unloaded, the container valve and the spacer valve are closed and, before the container is separated from the pipe and from the spacer, the inside of the hopper is washed.

Said washing is carried out using directional nozzles giving onto the inner surface of the hopper, to clean the surfaces of the two valves which will be in contact with the outside environment.

However, the solution just described is not without disadvantages, which are mainly due to the considerable dimensions of the washing chamber, which make thorough washing of it difficult.

Moreover, the use of nozzles located on the side surface of the hopper does not guarantee thorough cleaning of the valves and in particular their central zone.

To overcome the problems relative to environmental pollution with reference to the normal unloading devices described above, another solution was developed, described in EP 1.043.252.

Said solution relates to an unloading unit in which the valve element for closing the container consists not of the above-mentioned single disk-shaped element, but of two disk-shaped closing elements positioned one over the other and releasably connected to one another.

More precisely, said valve element behaves for all practical purposes, as regards opening and closing operations, like the devices described above but, at the moment when the container is substituted, the above-mentioned closing elements positioned one over the other are detached from one another and whilst the first closes the outfeed end of the empty container, the second closes the upper end of the spacer, preventing contact between the above-mentioned contaminated parts and the outside environment, towards which the faces that were previously in contact with one another face.

In the case of said valve element, before the two closing elements are separated, they may be washed to eliminate powder residues that are inevitably deposited in the circular ring formed by the two closing elements.

To facilitate washing of such devices, versions were developed equipped with detachment means substantially designed to noticeably move the closing elements away from one another so that they leave an air space between them which promotes cleaning before definitive separation.

The latter devices are also not without disadvantages.

Firstly, the production of closing elements which fit together perfectly requires high precision mechanical machining involving operating difficulties and high costs.

Moreover, a device made in that way requires constant and extended periodic maintenance since it is so complex that it needs continuous attention. The result of this is periodic, inconvenient, inevitable system downtime.

Due to its complex construction, the device just described also has surfaces that hold onto the powders at the end of unloading which have a substantially irregular shape and, therefore, are difficult to wash.

Even when an air space is created between the two closing elements, the washing space remains limited and, as a result, cleaning is not thorough enough, since the action of the detergent fluids, normally dispensed by spray nozzles of the known type, is not effective enough.

SUMMARY OF THE INVENTION

The aim of the present invention is, therefore, to overcome the above-mentioned disadvantages by providing a valve device which can be easily and effectively washed.

Another aim of the present invention is to provide a valve device which guarantees thorough and deep cleaning of all of the surfaces which came into contact with the loose material unloaded from the dispenser device.

Yet another aim of the present invention is to provide a valve device whose use minimizes the risks of environmental pollution, particularly when the container and the pipe are separated.

The technical features of the present invention, in accordance with the above-mentioned aims, are set out in the claims herein, in particular claim 1 and preferably any of the claims directly or indirectly dependent on claim 1.

The present invention also relates to a unit for unloading loose materials comprising the above-mentioned valve device and to a method for unloading loose materials using said unit.

There follows a description of a preferred embodiment of a valve device according to the present invention, by way of example and without limiting the scope for application.

BRIEF DESCRIPTION OF THE DRAWINGS

The advantages of the present invention are more clearly illustrated in the detailed description which follows, with reference to the accompanying drawings, which illustrate a preferred embodiment of the invention without limiting the scope of the inventive concept, and in which.

DESCRIPTION OF THE PREFERRED EMBODIMENTS

With reference to the accompanying drawings, and in particular with reference to FIGS. 1 to 5, the numeral 1 denotes a valve device, in particular a valve device 1 applied to a unit 2 for unloading loose materials.

Figure 1:
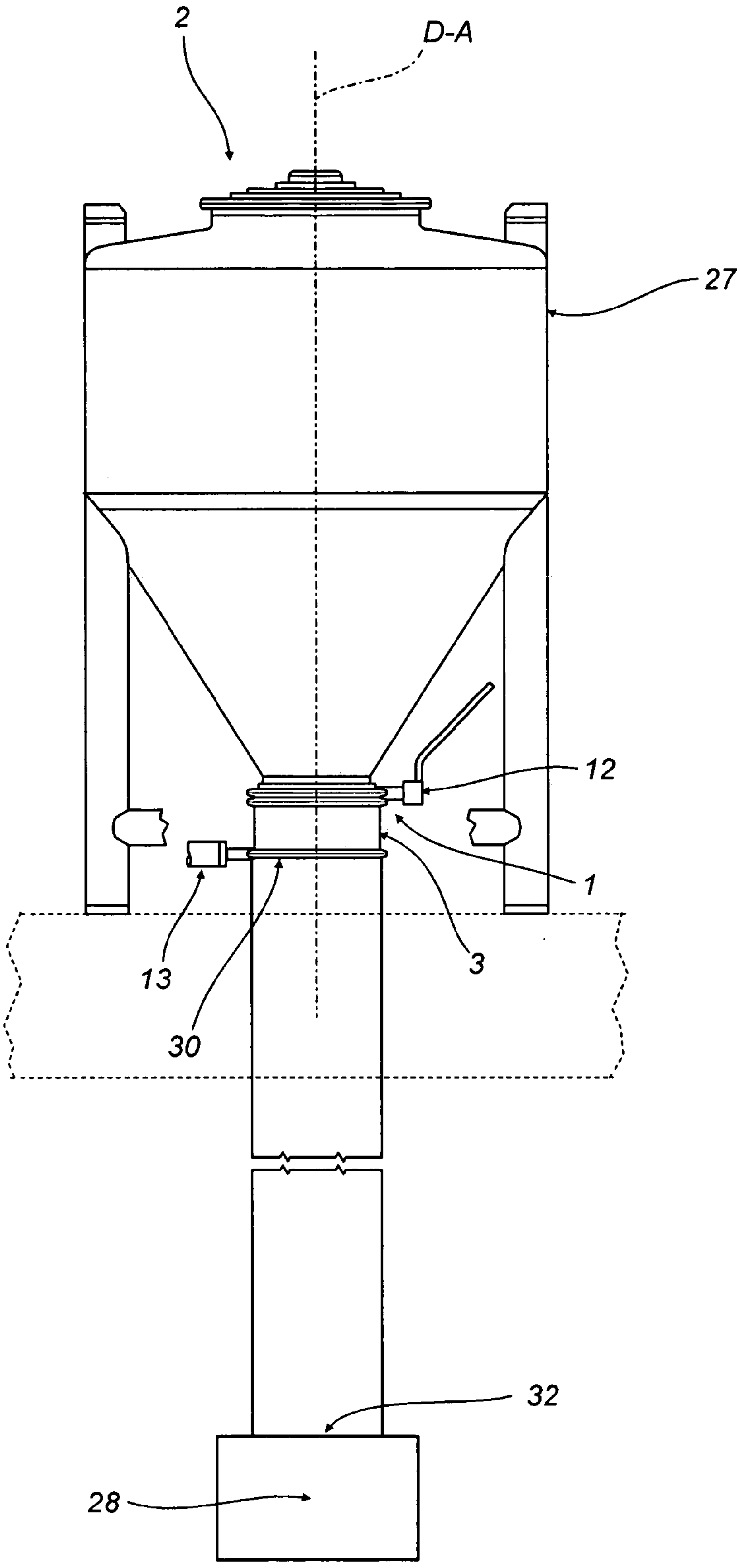
FIG. 1 is a schematic side view of a unit for unloading loose materials according to the present invention.
Figure 2:
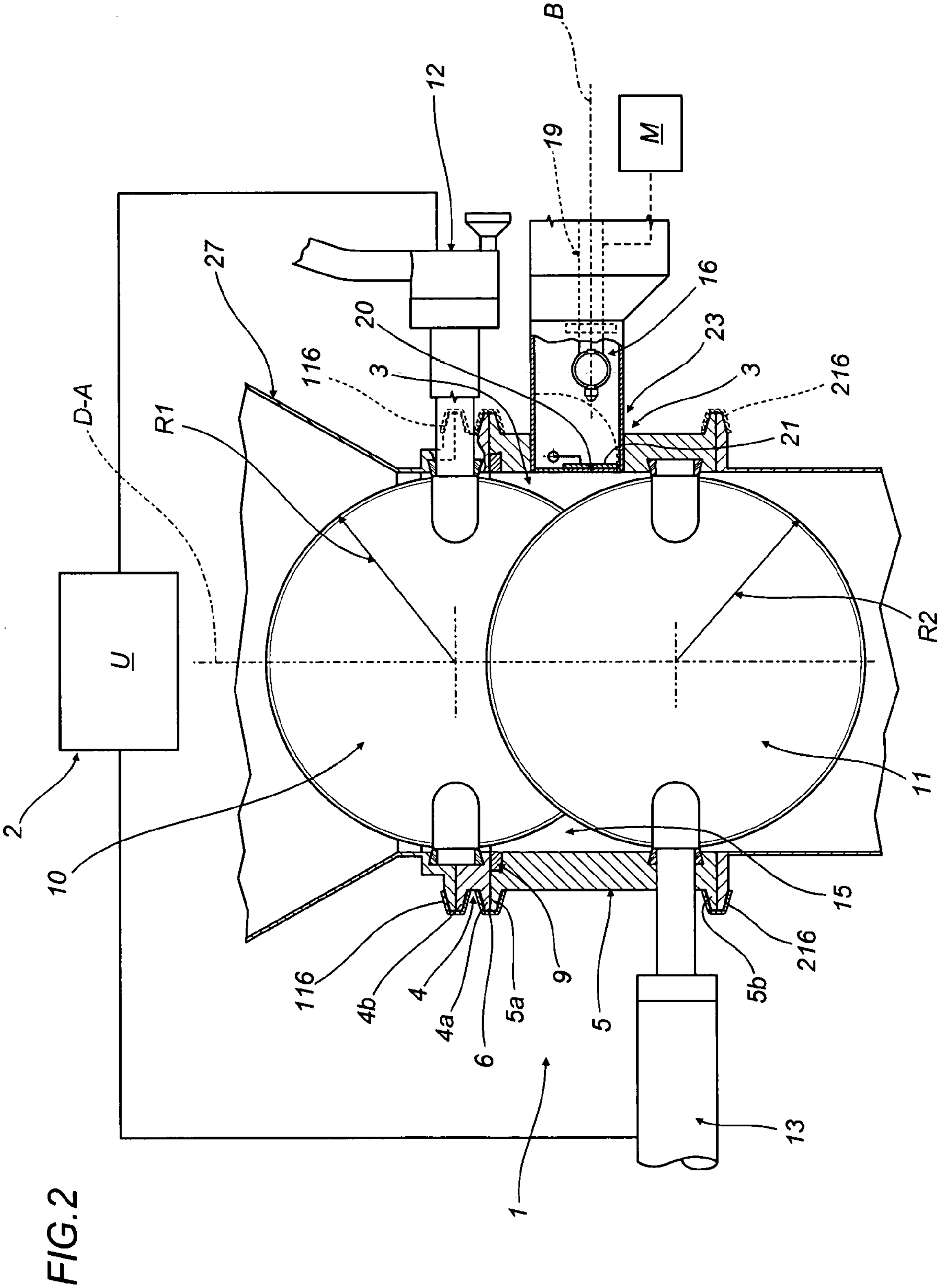
FIG. 2 is a schematic side view, suitably interrupted, with some parts in cross-section, of the unit illustrated in FIG. 1 in a first operating configuration.
Figure 3:
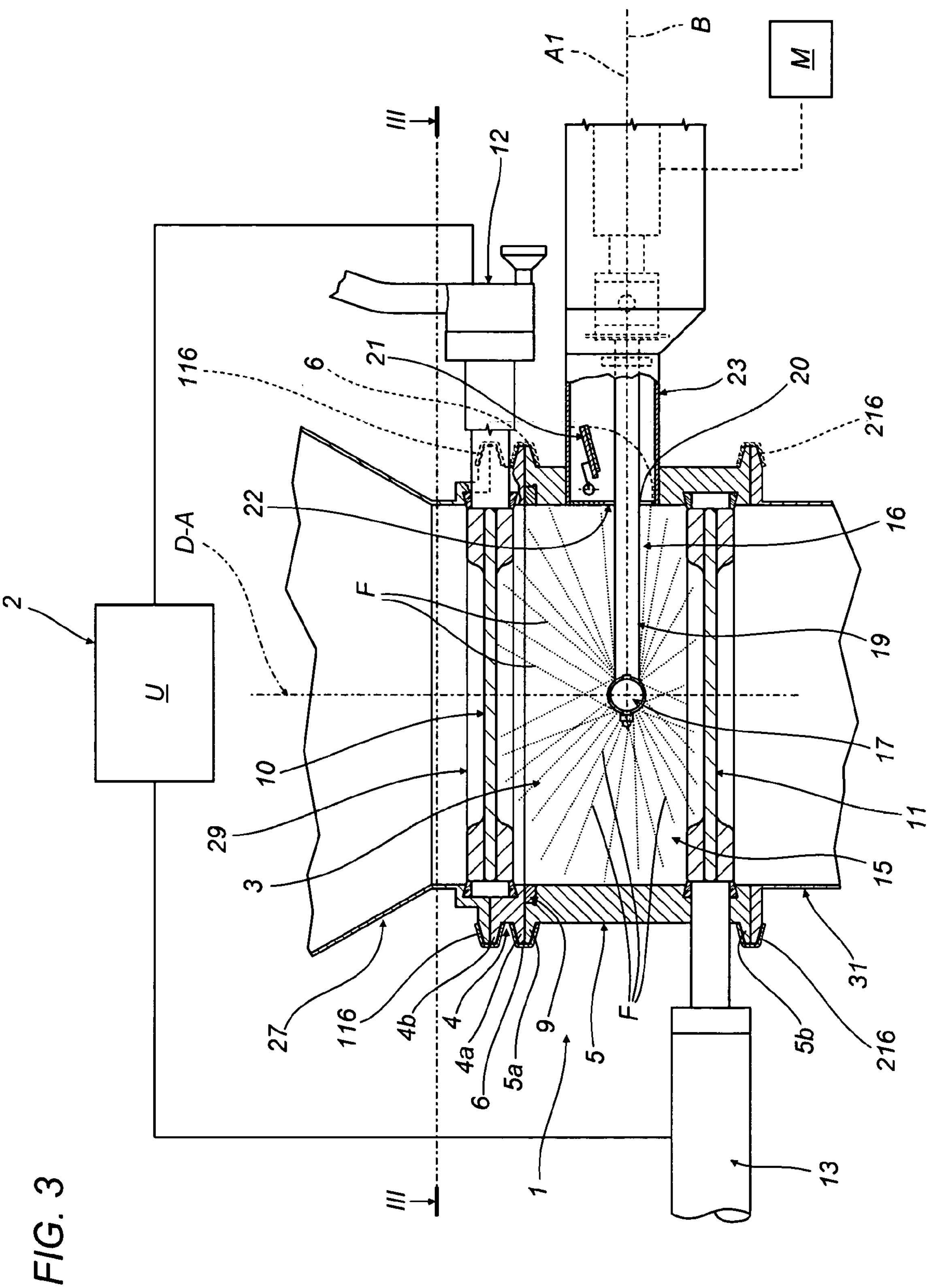
FIG. 3 is a schematic side view, suitably interrupted, with some parts in cross-section, of the unit illustrated in FIG. 1 in a different operating configuration to that illustrated in FIG. 2.
Figure 5:
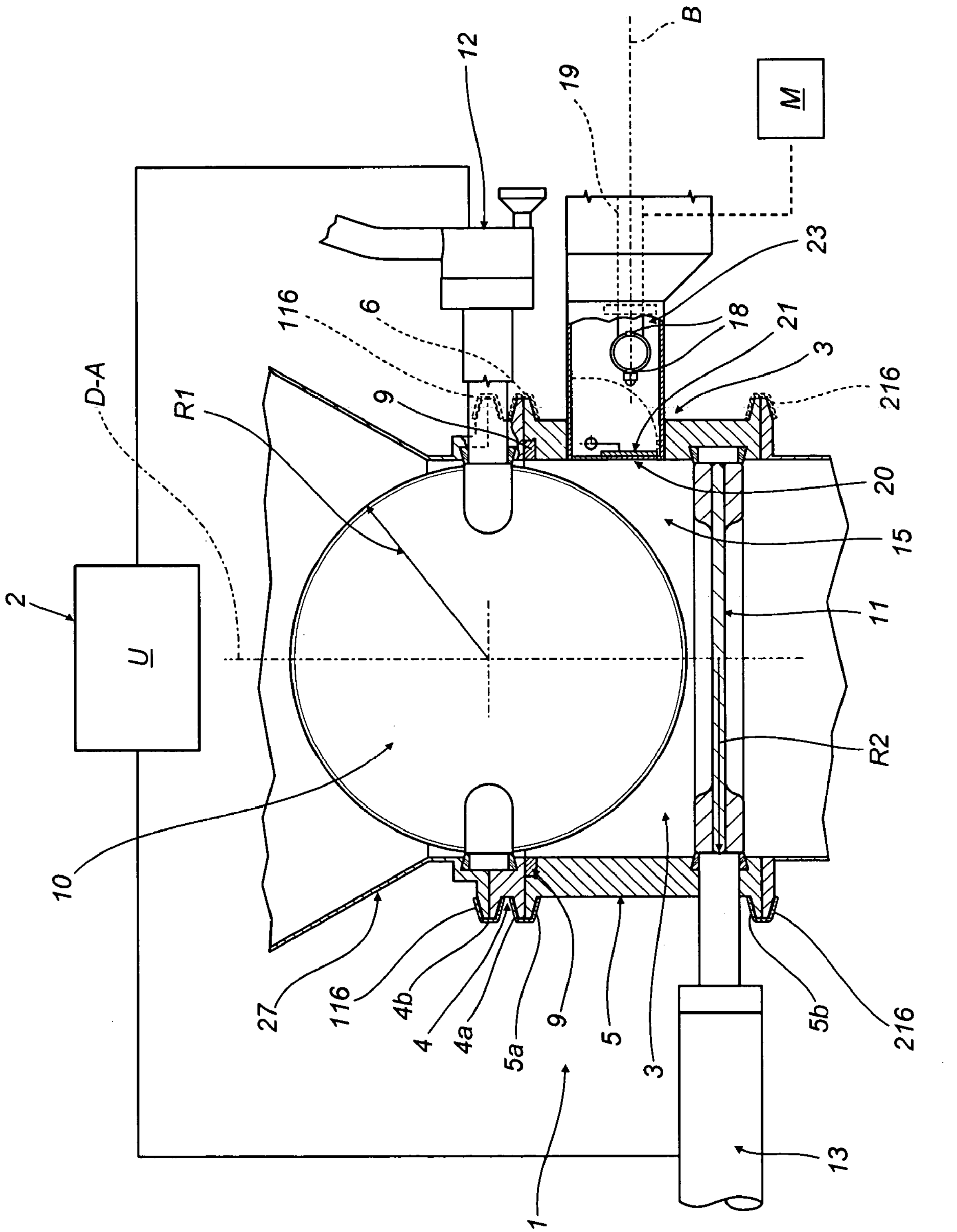
FIG. 5 is a schematic side view, suitably interrupted, with some parts in cross-section, of the unit illustrated in FIG. 1 in another operating configuration.

As illustrated in FIGS. 2, 3 and 5 the device 1 comprises a pipe 3, with a central axis A substantially coinciding with a unit 2 main direction D of extension.

The pipe 3 is formed by a first ring-shaped body 4, coaxially connected to a second ring-shaped body 5. Said ring-shaped elements 4 and 5 have respective outer profiles 4*a*, 4*b*, 5*a* and 5*b*, suitably shaped for reciprocal 4*a*–5*a* connection, and for connection to the unit 2 for unloading loose materials.

Figure 4:
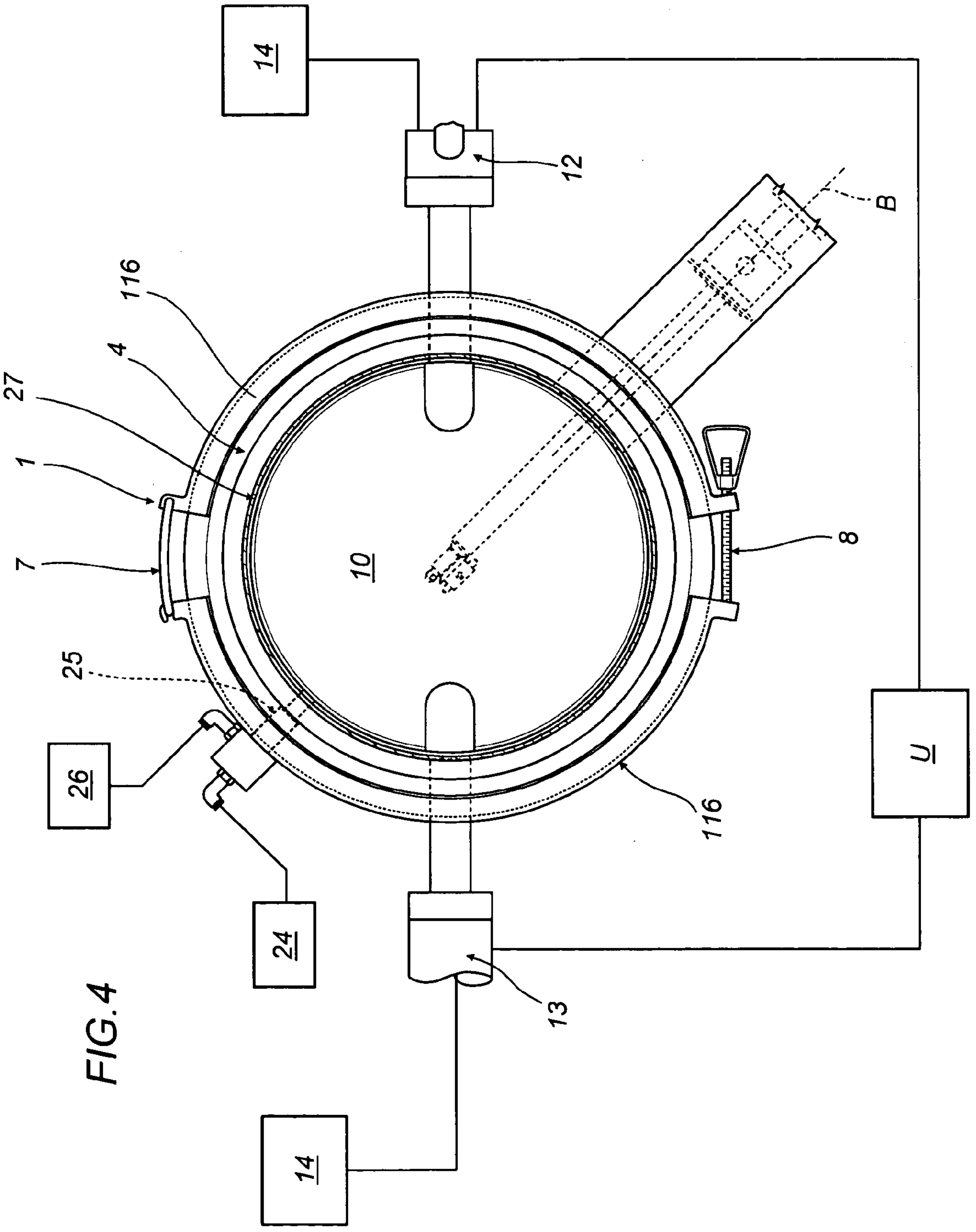
FIG. 4 is a schematic view, partly in cross-section according to line III illustrated in FIG. 3, of the unit for unloading loose material according to the present invention.

The above-mentioned reciprocal 4*a*–5*a* connection is guaranteed by detachable coupling means, located at the opposite profiles 4*a* and 5*a*, comprising a band 6 which has, as shown in FIG. 4, two half-parts joined by a ring 7 and a clamp screw 8.

Advantageously, between the first and the second ring-shaped bodies 4, 5 a seal 9 is inserted, also preferably ring-shaped, designed to guarantee a sealed connection between the elements 4 and 5.

The first and the second ring-shaped bodies 4 and 5 respectively support a first closing element 10 and a second closing element 11.

The first closing element 10 has a radius R1 and is mobile between a first position in which it leaves the pipe 3 open and a second position in which it seals the pipe closed.

The second closing element 11 has a radius R2 and is mobile between a first position in which it leaves the pipe 3 open and a respective second position in which it seals the pipe closed.

In the preferred embodiment illustrated, the radii R1 and R2 are substantially equal.

The elements 10 and 11 lie, in their respective open positions, in planes substantially parallel with the above-mentioned axis A and, in their respective closed positions, in planes substantially perpendicular to the axis A.

In this text, with reference to the respective orientation of the closing elements 10 and 11, the term horizontal means that the elements 10 and 11 lie in planes substantially perpendicular to the central axis A of the pipe 3, and the term vertical means that the elements 10 and 11 lie in planes substantially parallel with the axis A.

In other alternative embodiments, not illustrated, the closing elements 10 and 11, in their respective open and closed positions, may have any spatial orientation, depending on the user unit 3 in which they are used and according to the material with which they are designed to make contact.

It should be noticed that the first closing element 10 and the second closing element 11 are separated, when in their respective closed positions, by a distance slightly greater than their radius, to guarantee the possibility of separate opening of the elements 10 and 11, as illustrated in FIG. 5.

Figure 9:
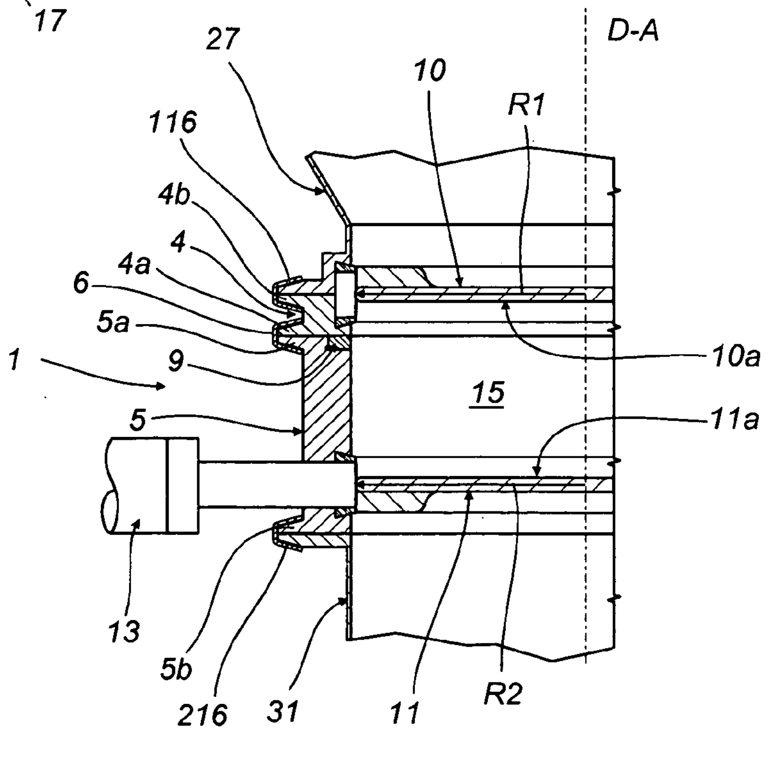
FIG. 9 is a schematic side view, suitably interrupted, with some parts in cross-section, of another embodiment of the device according to the present invention.

With reference to FIG. 9 which illustrates an alternative embodiment, the closing elements 10 and 11 are separated by a distance which is less than the radii R1 and R2. In the latter case, the elements 10 and 11, as better described below, must move simultaneously, since it is not possible to fully open only one of the elements 10 and 11.

In an alternative embodiment, not illustrated, the elements 10 and 11 have different radii R1 and R2. In this case, the distance between the closing elements 10, 11 must be greater than the largest of the two radii R1, R2 to allow separate movement of the elements 10 and 11.

With reference to the accompanying drawings from 2 to 5, the elements 10 and 11 are respectively connected, by way of example only, to a mechanical actuator 12 and to a pneumatic actuator 13 which drive the movement of the elements 10 and 11.

In embodiments not illustrated, said mechanical or pneumatic actuators 12 and 13 may also be fitted without distinction for one or for the other closing element 10, 11 or for both and there may be more than one actuator per closing element 10 and 11, for example depending on the dimensions of the elements 10 and 11.

The actuators 12 and 13 are controlled by a check and control unit U for their synchronized or separate movement.

In other words, the closing elements 10 and 11 may be opened simultaneously or independently of one another even according to their reciprocal positioning.

The device 1 also comprises a check sensor 14 for monitoring the position of the closing elements 10, 11 and, in particular, for verifying when the elements reach their respective closed or open positions.

The pipe 3 and the elements 10 and 11, in the respective closed positions, form a chamber 15 which can be washed by washing means operating at the chamber 15.

In particular with reference to FIG. 9, it may be seen that the closing elements 10 and 11 have respective surfaces 10*a*, 11*a* facing the inside of the chamber 15 which are smooth, that is to say, free of projections.

FIGS. 2 and 3 in particular show how the washing means comprise a washing part 16, mobile between a first, operating configuration in which it is inserted in the chamber 15, illustrated in FIG. 3, and a second, non-operating configuration in which it is at least partly outside the chamber 15, illustrated in FIG. 2. In particular, in the preferred embodiment illustrated by way of example, the part 16 is completely outside the chamber 15 in the non-operating configuration.

Figure 6:
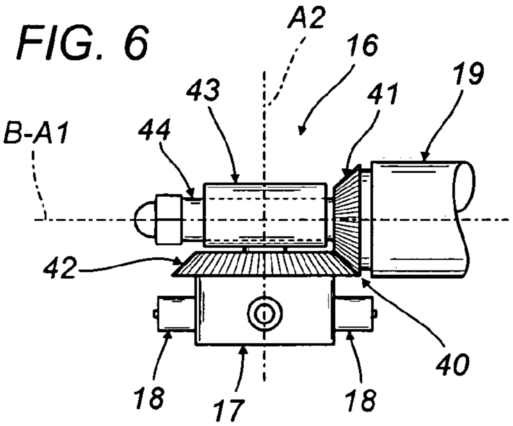
FIGS. 6 to 8 are three different schematic views of a detail of the device illustrated in the previous figures.
Figure 7:
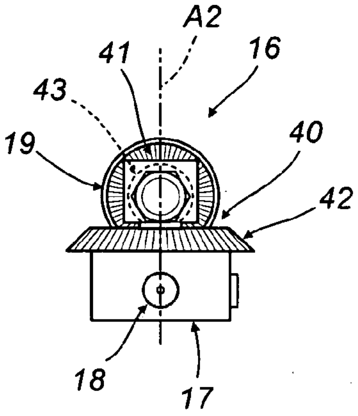
Figure 8:
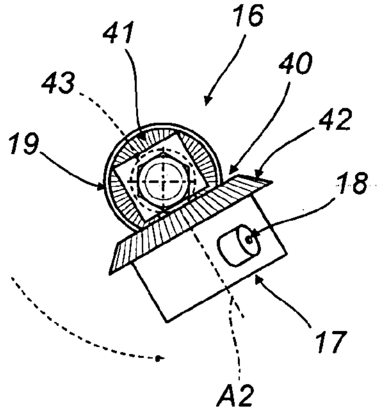

Taking a more detailed look and with reference to FIGS. 6 to 8, the part 16 comprises an orbital washing head 17 supporting a pair of nozzles 18 for dispensing a washing fluid F.

In this text the term orbital refers to the fact that the nozzles 18 supported by the head 17 are mobile in space.

In particular, in the preferred embodiment illustrated by way of example, the head 17 rotates about a first axis of rotation A1 substantially transversal, in particular perpendicular, to the central axis A of the pipe 3 and about a second axis A2 transversal to the first axis A1 and in particular perpendicular to it.

In the embodiment illustrated, although without in any way limiting the scope for application of the invention, the part 16 comprises an arm 19 supporting the orbital head 17 and having a main axis of extension B. The first axis of rotation A1 substantially coincides with the main axis B of the arm 19.

In particular, the head 17 is mobile according to a law of motion consisting of a first rotary movement about the first axis A1 and of a second rotary movement about the second axis A2.

Again with reference to FIGS. 6 to 8, the head 18 is connected to the arm 19 by a bevel gear pair 40 consisting of a first bevel gear 41, integral with the arm 19, and a second bevel gear 42 integral with the head 18.

The head 18 is connected in such a way that it can rotate idly to a supporting body 43 integral with a shaft 44, coaxial with the arm 19, which rotates, driven by motor means not illustrated, about the axis B.

Said configuration means that the head 17 can rotate about the axis A1, drawn by the supporting body 42, whilst the meshing of the bevel gears 40 and 41 induces the rotary movement of the head 17 about the axis A2.

In alternative embodiments not illustrated, there may be any number of nozzles 18 of any type, according to the geometry of the chamber 15 and the material to be washed. Even the head 17 may be mobile according to any law of motion, designed to effectively direct the washing fluid F inside the chamber 15.

Moreover, advantageously, the head 17 can be stably inserted in the chamber 15. This positioning is achieved both with the washing part 16 extending stably inside the chamber 15, and by fixing the head 17 on the inner surface of the chamber 15.

In a preferred embodiment of the device disclosed not illustrated, the head 17 is housed inside a covering cap designed to facilitate head cleaning and prevent dirt deposits and the build up of materials between the elements located at the head 17.

As illustrated in FIGS. 2, 3 and 5, the chamber 15 has an opening or entrance 20 close to which sealing means are operatively active, comprising a door 21, mobile between a first, outer position in which the chamber 15 is sealed closed, when the part 16 is in the non-operating configuration, and a second, open position when the part 16 can pass through the opening 20.

The sealing means also comprise a seal element 22, located at the opening 20 to guarantee that the chamber 15 is sealed closed and to prevent the material unloaded through the device 1 from escaping.

It should also be noticed that in the embodiment illustrated, the opening 20 is made in the second ring-shaped body 5 but, advantageously, in embodiments not illustrated, it may be made in any position in the side surface of the pipe 3.

At the opening 20 there is also a structure 23 which supports and receives the part 16, comprising drive means M of the known type for moving the part 16.

In particular with reference to FIG. 4, it should be noticed that the device 1 comprises drying means communicating with the chamber 15, designed to dry the chamber 15 once it has been washed, if the fluid F is in the liquid state. Said means comprise a compressed air source 24 communicating with the inside of the chamber 15 through a channel 25.

The device 1 also comprises a suction apparatus 26, also communicating with the inside of the chamber 15 through the channel 25, and together with the channel 25, forming suction means designed to extract the washing fluid F from the chamber 15.

The suction means are also designed to depressurize the chamber 15, that is to say, to bring the pressure inside the chamber 15 to a value lower than the atmospheric pressure, at least during washing, to prevent any fluid F from escaping.

In alternative embodiments not illustrated, the suction apparatus 26 may be fluidly connected to the chamber 15 by a plurality of channels 25.

Similarly, the drying means may comprise a plurality of channels, not illustrated, even separate from the channel 25 used for suction, communicating with the chamber 15. The number and distribution of said channels, which are not illustrated, depends on the extent and shape of the chamber 15.

The drying means may also comprise the same orbital head 17 that can be used to dispense compressed air, which may be hot, to dry the chamber 15.

Advantageously, the suction means may also extract from the chamber 15 any loose material powder residues which may have been deposited during use of the device 1, as described below.

In the unit 2 for unloading loose materials, the device 1, as described, is inserted between a dispenser device 27 and a user unit 28 and, in particular, the first ring-shaped body 4 is connected, at the profile 4*b*, to a device 27 outfeed 29 and the second ring-shaped body 5 is connected, at the profile 5*b*, to an infeed end 30 of a tube 31 whose second end 32 is connected to the user unit 28. Said connections are made with detachable coupling means similar to those previously described, that is to say, using a first band 116 and a second band 216 each made in two parts and joined by a respective ring and a respective clamp screw.

It should be noticed that, in alternative embodiments not illustrated, the device 1 and the unit 2 may not be fitted with the above-mentioned detachable coupling means, both between the ring-shaped bodies 4 and 5 and between the device 1 itself 2 and the rest of the unit 2. In particular, said connections may be made by gravity, that is to say, by the pressure applied by the dispenser device 27 on the rest of the unit 2, or by elastic means of the substantially known type.

In practice, to unload loose material from the dispenser device 27, the device 27 itself, together with the first ring-shaped body 4 and the first closing element 10, which blocks the device 27 outfeed 29, is placed, using known methods, on the tube 31 closed by the second closing element 10 and is fixed to the second ring-shaped body 5, therefore forming the chamber 15.

If the unit 2 or the device 1 are positioned in a polluted or uncontrolled environment, the chamber 15 may be washed before unloading the material, to prevent pollution of the material itself.

Washing is preferably carried out after depressurizing the chamber 15 with the suction means. In particular, the washing part 16, or rather the orbital head 16, is inserted in the chamber 15, and the chamber is cleaned.

After washing, preferably keeping the pressure inside the chamber 15 at a value lower than that of the atmospheric pressure, the chamber 15 is dried if the fluid F used is in the liquid state.

The elements 10 and 11 are then brought into the respective open positions (simultaneously or separately depending on the type of chamber) and the material is unloaded from the dispenser device 27 to the user device 28.

When unloading is complete, after returning the elements 10 and 11 to their respective closed positions, the chamber 15 can be washed again, as described above, to eliminate any residues of the material unloaded from the walls of the chamber 15 and, in particular, from the surfaces of the elements 10 and 11.

When this further washing is complete, the two ring-shaped elements 4 and 5 may be separated, that is to say, the dispenser device 27 may be separated from the tube 31, without dispersing particles of the material dispensed into the outside environment, since the inner surfaces of the pipe 3 and of the closing elements 10 and 11 are clean.

It should be noticed that all of the washing and drying operations preferably take place at a pressure lower than the atmospheric pressure, to minimize the risk of the washing fluid escaping.

The invention fulfils the preset aims since the use of an orbital washing head inserted in the washing chamber guarantees thorough cleaning of every element forming the chamber and prevents both pollution of the material to be unloaded and pollution of the environment at the end of unloading.

The invention described is suitable for evident industrial applications and may be subject to modifications and variations without thereby departing from the scope of the inventive concept. Moreover, all of the details of the invention may be substituted with technically equivalent elements.

What is claimed is:

1. A valve device comprising a pipe, a first closing element mobile between a first position in which it leaves the pipe open and a second position in which it seals the pipe closed, and a second closing element, mobile between a first position in which it leaves the pipe open and a second position in which it seals the pipe closed, the pipe and the first and second closing elements in their respective second closed positions forming a chamber, means for washing the chamber (15), wherein the washing means comprise an orbital head for supporting at least one nozzle for dispensing a washing fluid.

2. The device according to claim 1, in which the washing fluid is in the liquid state, comprising means for drying the chamber.

3. The device according to claim 1, comprising actuator means connected to the first and the second closing elements to move the first and the second elements between their respective first and second positions.

4. The device according to claim 3, comprising a check and control unit connected to the actuator means for synchronized movement of the first and the second closing elements.

5. The device according to claim 3, comprising a check and control unit connected to the actuator means for separate movement of the first and the second closing elements.

6. The device according to claim 3, wherein the actuator means comprise at least one mechanical actuator for moving the first and the second closing elements.

7. The device according to claim 3, wherein the actuator means comprise at least one pneumatic actuator for moving the first and the second closing elements.

8. The device according to claim 1, comprising a check sensor for verifying when the first and the second closing elements reach the first and second positions.

9. The device according to claim 1, wherein the first and the second closing elements are disk-shaped and respectively have a first radius and a second radius.

10. The device according to claim 9, wherein in their respective closed positions, the first closing element and the second closing element are separated by a distance that is slightly greater than the largest of the first and the second radii.

11. The device according to claim 10, wherein the first and the second radii are equal.

12. The device according to claim 1, wherein in their respective open positions the first and the second closing elements can be partly positioned one over the other.

13. The device according to claim 1, wherein in their respective open positions the first and the second closing elements are substantially vertical.

14. The device according to claim 1, wherein in their respective closed positions the first and the second closing elements are substantially horizontal.

15. The device according to claim 1, comprising suction means communicating with the chamber for extracting the washing fluid from the chamber.

16. The device according to claim 15, wherein the suction means are designed to depressurize the chamber.

17. The device according to claim 1, wherein the pipe comprises a first ring-shaped body, supporting the first closing element and a second ring-shaped body, supporting the second closing element, coaxially connected in a sealed fashion to the first ring-shaped body.

18. The device according to claim 17, comprising a substantially ring-shaped seal inserted between the first and the second ring-shaped bodies and detachable coupling means operatively inserted between the first ring-shaped body and the second ring-shaped body, guaranteeing a seal between the first and the second ring-shaped bodies.

19. A unit for unloading loose materials from a dispenser device to a user unit, comprising a valve device according to claim 17 located between the dispenser device and the user unit.

20. The unit for unloading loose materials according to claim 19, wherein the pipe is located between the dispenser device and a first infeed end of a tube whose second end is connected to the user unit.

21. The unit for unloading loose materials according to claim 20, wherein the first ring-shaped body, is connected to a dispenser device outfeed and the second ring-shaped body is connected to the tube first infeed end.

22. A method for unloading loose material from a dispenser device to a user unit forming a unit for unloading materials, said unloading unit comprising a pipe, located between the dispenser device and the user unit, a first closing element mobile between a first position in which it leaves the pipe open and a second position in which it seals the pipe closed, a second closing element mobile between a first position in which it leaves the pipe open and a second position in which it seals the pipe closed, the pipe and the first and the second closing elements in their respective second closed positions forming a chamber, means for washing the chamber, the method comprising the step of washing the chamber using an orbital head.

23. The method according to claim 22, wherein the washing step comprises the step of inserting the orbital head in the chamber.

24. A valve device comprising a pipe, a first closing element mobile between a first position in which it leaves the pipe open and a second position in which it seals the pipe closed, and a second closing element, mobile between a first position in which it leaves the pipe open and a second position in which it seals the pipe closed, the pipe and the first and second closing elements in their respective second closed positions forming a chamber, means for washing the chamber (15), wherein the washing means comprise an orbital head for supporting at least one nozzle for dispensing a washing fluid;

wherein the washing means comprise a washing part, connected to the orbital head, the part being mobile between a first, operating configuration in which it is inserted in the chamber and a second, non-operating configuration in which it is at least partly outside the chamber.

25. The device according to claim 24, wherein the orbital head comprises a plurality of nozzles for dispensing the washing fluid.

26. The device according to claim 24, in which the pipe has a central axis, wherein the orbital head rotates about a first axis of rotation substantially transversal to the central axis.

27. The device according to claim 26, wherein the orbital head rotates about a second axis of rotation substantially transversal to the first axis.

28. The device according to claim 27, wherein the head is mobile according to a law of motion consisting of a first rotary movement about the first axis and a second rotary movement about the second axis.

29. The device according to claim 26, wherein the washing part comprises an arm supporting the orbital head.

30. The device according to claim 29, wherein the first axis of rotation of the head forms an axis of extension of the arm.

31. The device according to claim 27, wherein the second axis of rotation is substantially parallel with the central axis of the pipe.

32. The device according to claim 24, comprising an entrance to the chamber for the washing part and sealing means operatively active at the entrance to seal the chamber when the part is in the second, non-operating configuration.

33. A method for unloading loose material from a dispenser device to a user unit forming a unit for unloading materials, said unloading unit comprising a pipe, located between the dispenser device and the user unit, a first closing element mobile between a first position in which it leaves the pipe open and a second position in which it seals the pipe closed, a second closing element mobile between a first position in which it leaves the pipe open and a second position in which it seals the pipe closed, the pipe and the first and the second closing elements in their respective second closed positions forming a chamber, means for washing the chamber, the method comprising the step of washing the chamber using an orbital head; the method comprising the step of depressurizing the chamber using suction means communicating with the chamber.

* * * * *